Feb. 5, 1952 D. G. C. HARE 2,584,386

BAND PASS FILTER NETWORK

Filed May 11, 1944 3 Sheets-Sheet 1

Inventor
DONALD G. C. HARE

By [signature]

Attorney

Feb. 5, 1952 D. G. C. HARE 2,584,386

BAND PASS FILTER NETWORK

Filed May 11, 1944 3 Sheets-Sheet 2

Inventor
DONALD G. C. HARE

By [signature]
Attorney

Feb. 5, 1952 D. G. C. HARE 2,584,386

BAND PASS FILTER NETWORK

Filed May 11, 1944 3 Sheets-Sheet 3

Inventor
DONALD G.C. HARE

By [signature]
Attorney

Patented Feb. 5, 1952 2,584,386

UNITED STATES PATENT OFFICE 2,584,386

BAND-PASS FILTER NETWORK

Donald G. C. Hare, Roslyn, N. Y., assignor to the United States of America as represented by the Secretary of the Navy Application May 11, 1944, Serial No. 535,161

10 Claims. (Cl. 179—171)

This invention relates to an improved filter network, and more particularly to a filter network adapted for providing improved characteristics at relatively low frequencies without requiring the use of inductive elements.

Sharply selective electric wave filters in the past have usually employed combinations of inductance, capacitance and resistance to secure the desired characteristics. At relatively low frequencies, as for example audible frequencies, the design of such filters is complicated by the fact that the inductive elements become so large as to be inconvenient physically and relatively too expensive.

Efforts have been made in the past to obviate this difficulty by utilizing filter systems employing resistive and capacitive elements only. Such filters are relatively unsatisfactory because their cut-off points are poorly defined. For example, it takes ten cascaded L sections, each comprising shunt resistance and series capacitance, to provide a high-pass filter which has an attenuation of eight decibels in response in the first octave below its cut-off frequency, the latter frequency in this instance being considered that at which the response is down three decibels. Increasing the number of sections by a factor of ten provides an improvement of only one decibel in the first octave. It is obvious, therefore, that such simple configurations are not satisfactory for many filter applications.

Improved results have been secured, in filter networks without inductance, by employing a parallel-T network in the feedback loop of a feedback amplifier, in such a manner that there is substantially no attenuation in the amplification at the null frequency of the network, the attenuation increasing rapidly either below or above this frequency due to the rise in feedback voltage which the network transmits. Arrangements of this type are described by H. H. Scott in the February 1938 issue of the "Proceedings of the Institute of Radio Engineers."

In the same issue of the latter publication, G. H. Fritzinger describes the use of a multi-stage feedback amplifier, using a resistive-capacitive network in the feedback loop, connected to a simple resistive-capacitive filter. This disclosure relies upon regenerative peaks to sharpen the shoulder of the response curve, resulting in an inherent tendency toward instability. With the high-pass arrangement shown, it required three stages of amplification within the feedback loop to secure a decrease in the transmission of approximately 25 decibels in the first octave below the cut-off frequency It is an object of the present invention, therefore, to provide an improved electric wave filter which is especially adapted for use at low frequencies, which employs no inductive elements, which is degenerative, and which provides a transmission characteristic closely comparable with that previously secured only by employing a multi-stage amplifier or with the aid of cumbersome and expensive inductance devices. Basically, the present invention contemplates a feedback amplifier employing in its feedback loop a network having a sharply peaked attenuation curve, and a network connected to the amplifier and having a gradually sloping transmission curve. The frequency at which the attenuation curve is peaked, together with the shape of this curve, are so chosen that it combines with the transmission curve to provide an overall resultant characteristic having the desired cut-off frequency and the desired response below and above this frequency. The manner of making this choice will be described below.

It will be understood that, by suitable choice and arrangement of constants, this basic arrangement may be employed as a low-pass filter or as a high-pass filter. By combining two filters, one low-pass and the other high-pass, a band-pass wave filter in accordance with the present invention may be provided.

For a better understanding of the invention, together with other and further objects thereof, reference is made to the following description taken in connection with the accompanying drawings, and its scope will be pointed out in the appended claims.

Figure 1:
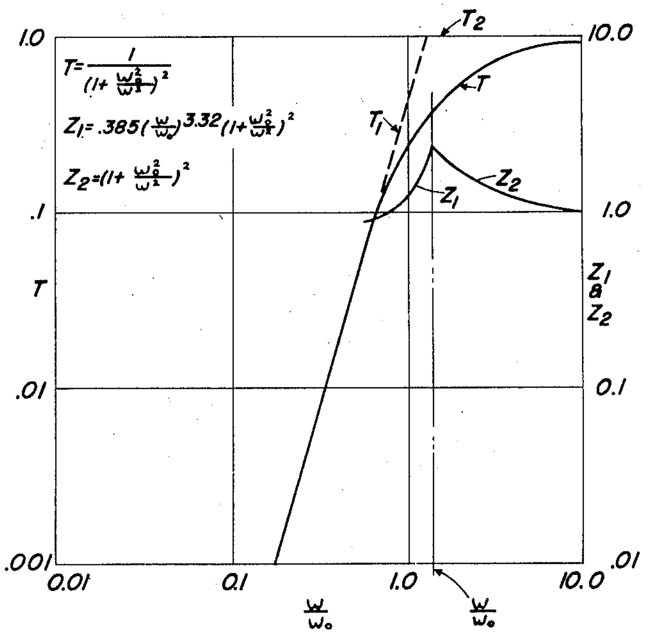
Fig. 1 is a graph illustrating the theory of the present invention.

The following theoretical analysis serves to illustrate the application of the invention in the design of a high-pass filter. It will be understood that a similar derivation may be employed for low-pass filters, and that the theory for band-pass filters is a combination of the low-pass and high-pass theory.

In a high-pass RC filter having $n$ identical sections, the transmission is given by:

$$T=\left(1+\frac{w_0^2}{w^2}\right)^{-\frac{n}{2}} \quad (1)$$

where $$w_0=\frac{1}{RC}$$

Let $w_1$ be a point below which the attenuation is to be N decibels per octave, and above which the transmission is to be unity. In the region below $w_1$ the transmission may be expressed by:

$$T_1=K\left(\frac{w}{w_0}\right)^{\frac{N}{20\log 2}} \qquad (2)$$

Above $w_1$, the transmission may be given by the following expression:

$$T_2=1 \qquad (3)$$

If T of Equation 1 is multiplied by a suitable function, its value may be changed to that of $T_1$ or $T_2$ as specified respectively in Equations 2 and 3. Therefore, $$T_1=Z_1T$$

and $$T_2=Z_2T$$

The multiplying factors $Z_1$ and $Z_2$ have the following values:

$$Z_1=\frac{T_1}{T}=K\left(\frac{w}{w_0}\right)^{\frac{N}{6.02}}\times\frac{1}{T} \qquad (4)$$

$$=K\left(\frac{w}{w_0}\right)^{\frac{N}{6.02}}\times\left(1+\frac{w_0^2}{w^2}\right)^{\frac{n}{2}} \qquad (5)$$

and $$Z_2=\frac{1}{T}=\left(1+\frac{w_0^2}{w^2}\right)^{\frac{n}{2}} \qquad (6)$$

Circuit elements providing the characteristics of Equations 5 and 6 are used in combination with the RC filter network to produce the desired resultant characteristic.

In the ordinary high-pass RC filter described above, the point below which an attenuation of at least N decibels per octave is obtained may be defined as follows:

$$\left(\frac{w}{w_0}\right)_N=\left(\frac{4-10^{\frac{N}{10n}}}{10^{\frac{N}{10n}}-1}\right)^{\frac{1}{2}} \qquad (7)$$

This expression may conveniently be used to choose K so that T and $T_1$ will be equal at $$\left(\frac{w}{w_0}\right)_N$$

This is done by substituting the value of $$\left(\frac{w}{w_0}\right)_N$$

which is given by Equation 7 for $$\left(\frac{w}{w_0}\right)$$

in Equation 4, and solving for K as follows:

$$K=\frac{T_1}{\left(\frac{w}{w_0}\right)^{\frac{N}{6.02}}}=\frac{T_1}{\left(\frac{4-10^{\frac{N}{10n}}}{10^{\frac{N}{10n}}-1}\right)^{\frac{N}{12.04}}} \qquad (8)$$

Fig. 1 of the drawings shows the application of the above theoretical analysis to a particular problem. In this case, which covers a four-section RC high-pass filter:

$n=4$
$N=20$
$K=0.385$

The resultant characteristic, shown by curves $T_1$ and $T_2$, has an attenuation below the $w_1$ or cut-off point of at least 20 decibels per octave, and unity transmission above this point. It is obtained by combining curves $Z_1$ and $Z_2$ with curve T, the characteristic of the RC filter alone.

Figure 2:
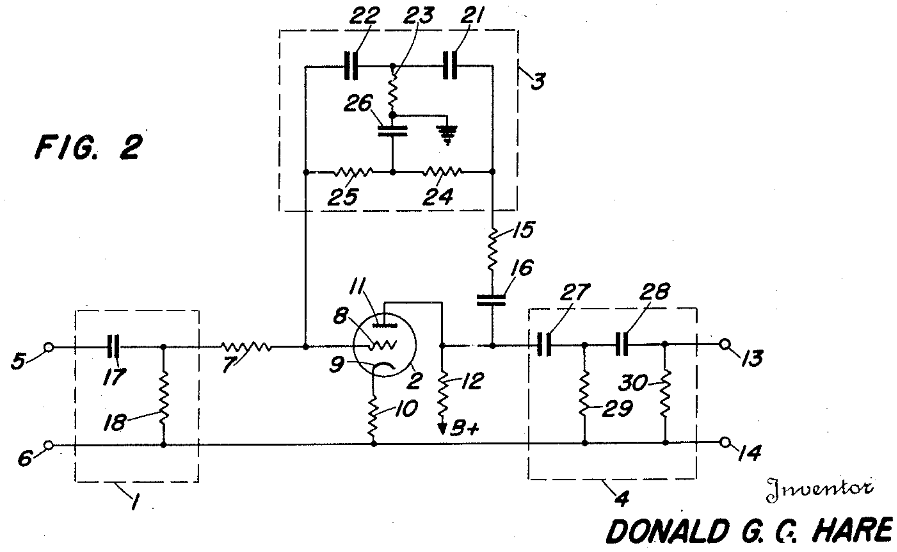
Fig. 2 is a circuit diagram of a high-pass filter network in accordance with the present invention.

Referring now to Fig. 2 of the drawings, there is shown a high-pass filter in accordance with the invention which includes an input high-pass RC filter network 1, an amplifying vacuum tube 2, a parallel-T network 3, and an output high-pass RC filter network 4. High-pass filter network 1 is serially connected with amplifying vacuum tube 2 and its associated parallel-T network 3, and the tube and parallel-T network is serially connected to high-pass filter network 4. Input terminals 5 and 6 are connected to the input of filter network 1, the output of which is connected, through series resistor 7, to grid 8 of vacuum tube 2, and to ground. Cathode 9 of vacuum tube 2 is grounded through resistor 10. Plate 11 of vacuum tube 2 is connected, through resistor 12, to a source of positive potential indicated by B+. Plate 11 is also connected to one input terminal of filter network 4, the other input terminal of which is grounded. The output of network 4 is connected to output terminals 13 and 14. The ungrounded input terminal of parallel-T network 3 is connected, through resistor 15 and capacitor 16, to plate 11 of vacuum tube 2. The ungrounded output terminal of network 3 is connected directly to grid 8 of vacuum tube 2.

Filter network 1 comprises series capacitor 17 and shunt resistor 18. Parallel-T network 3 has two branches, one comprising series capacitors 21 and 22 together with shunt resistor 23, and the other comprising series resistors 24 and 25 together with shunt capacitor 26. Filter network 4 comprises series capacitors 27 and 28, and shunt resistors 29 and 30.

In operation, an input signal applied to input terminals 5 and 6 is subjected to the usual high-pass transmission characteristics of filter networks 1 and 4, which are such that the transmission increases gradually to the so-called cut-off frequency and then becomes relatively uniform. The characteristic of parallel-T network 3, however, is such that a relatively large feedback voltage is supplied from the plate circuit of vacuum tube 2 to its grid circuit at all frequencies except the critical one for which the network is adjusted. As a result, the full amplification of vacuum tube 2 is realized only at this critical frequency, and the transmission of the system as a whole is substantially reduced at frequencies below and above the critical one.

Figure 5:
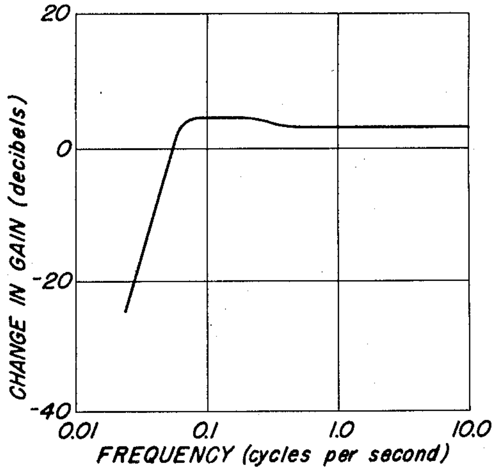
Figs. 5, 6 and 7 are graphs showing the characteristics of the filters schematically shown respectively in Figs. 2, 3 and 4.

The over-all response curve of the system, which is achieved due to the combined effect of RC filter networks 1 and 4 and of parallel-T network 3, is shown in Fig. 5. In the particular arrangement the characteristics of which are represented by the curve of Fig. 5, the cut-off frequency was 0.07 cycle per second. Below this frequency, the decrease in transmission was approximately 20 decibels per octave. In the range from 0.07 cycle to 10 cycles per second, the response was uniform within approximately one decibel. It will be readily appreciated by those skilled in the art that the cut-off frequency in a particular case, together with the shape of the curve both below and above this frequency, may be varied within wide limits by a suitable choice of circuit constants. The characteristic shown in Fig. 5 was obtained by using the constants which are tabulated in a later paragraph.

Figure 3:
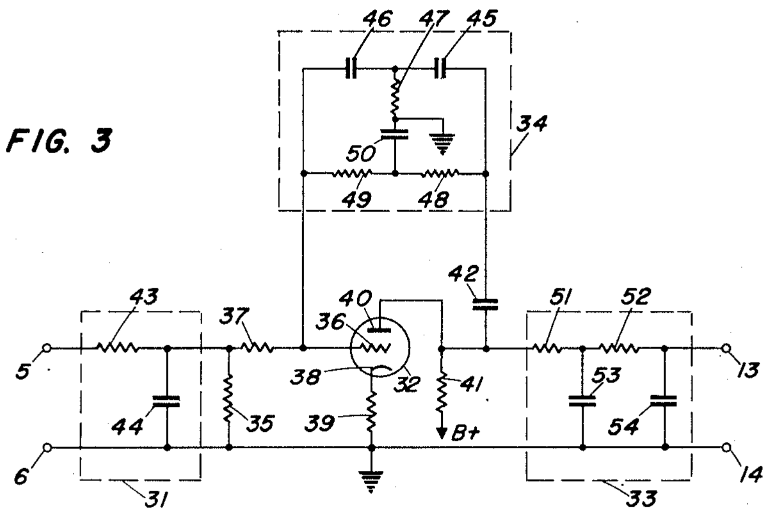
Fig. 3 shows a circuit diagram of a filter system arranged to provide a low-pass characteristic.

Fig. 3 shows a low-pass filter in accordance with the invention comprising an input low-pass RC filter network 31, vacuum tube 32, an output low-pass RC filter network 33, and parallel-T network 34. Low-pass filter network 31 is serially connected with vacuum tube 32 and its associated parallel-T network 34, and the tube and parallel-T network is serially connected to low-pass filter network 33. Input terminals 5 and 6 feed directly into RC filter network 31, the output of which is shunted by resistor 35 and connected to grid 36 of vacuum tube 32 through resistor 37. Cathode 38 is grounded through resistor 39. Plate 40 is connected to a source of positive potential indicated by B+, through resistor 41. Plate 40 is also connected to one input terminal of filter network 33, the other input terminal of which is grounded. The output of network 33 is connected to output terminals 13 and 14. The high-potential input terminal of parallel-T network 34 is connected, through capacitor 42, to plate 40. The high-potential output terminal of this network is connected to grid 36. The low-potential input and output terminals of network 34 are grounded.

Filter network 31 comprises series resistor 43 and shunt capacitor 44. In parallel-T network 34, one branch comprises series capacitors 45 and 46 and shunt resistor 47, and the other branch comprises series resistors 48 and 49 and shunt capacitor 50. Filter network 33 comprises series resistors 51 and 52, and shunt capacitors 53 and 54.

Figure 6:
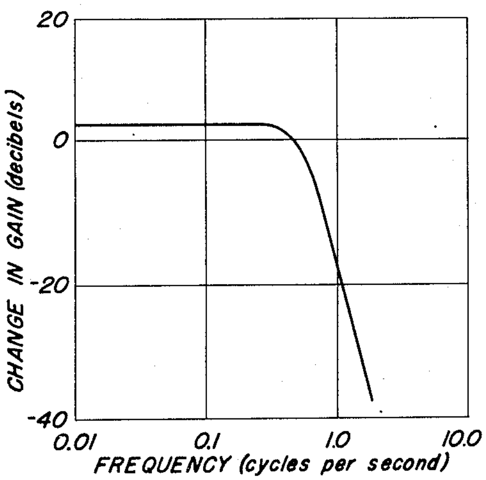

The operation of the system of Fig. 3 is similar to that Fig. 2, except that it has a low-pass instead of a high-pass characteristic. The over-all characteristic curve of one embodiment in accordance with Fig. 3 is shown in Fig. 6. In this particular case, the cut-off frequency was 0.5 cycle per second. Below this frequency the response was uniform within approximately one decibel. Above the cut-off frequency, the response decreased at the rate of approximately 20 decibels per octave. It will be understood, of course, that both the cut-off frequency and the shape of the characteristic curve may be varied within wide limits by a suitable choice of constants, and that the particular constants stated in a later paragraph and used in obtaining the characteristic curve of Fig. 6 are merely by way of example and in no sense a limitation on the scope of the invention.

Figure 4:
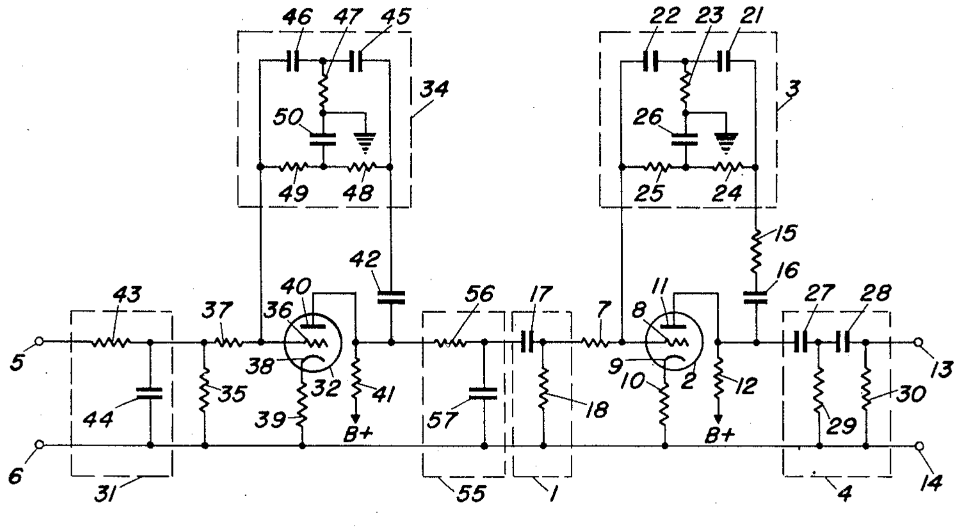
Fig. 4 is the circuit diagram of a band-pass filter in accordance with the present invention.

Fig. 4 shows a band-pass filter system in accordance with the invention which comprises, in essence, the high-pass filter of Fig. 2 connected in cascade with the low-pass filter of Fig. 3. Like circuit components are designated by like reference numerals. Input terminals 5 and 6 are connected through low-pass RC filter network 31 and through resistor 37 to grid 36 of vacuum tube 32, and to ground. Cathode 38 of vacuum tube 32 is grounded through resistor 39. Plate 40 of vacuum tube 32 is connected, through resistor 41, to a source of positive potential indicated by B+. As in Fig. 3, parallel-T network 34 has its ungrounded input and output terminals connected respectively to plate 40 through capacitor 42, and to grid 36.

Plate 40 of vacuum tube 32 is also connected to the ungrounded input terminal of low-pass RC filter 55 comprising series resistor 56 and shunt capacitor 57. The output of this filter is connected to the input of high-pass RC filter 1, the output of which in turn in connected through resistor 7 to grid 8 of vacuum tube 2, and to ground. Cathode 9 of vacuum tube 2 is grounded through resistor 10. Plate 11 of vacuum tube 2 is connected through resistor 12 to a source of positive potential indicated by B+, and also to the high-potential input terminal of high-pass filter 4. The output of this filter is connected to output terminals 13 and 14. As in Fig. 2, parallel-T network 3 has its high-potential input and output terminals connected respectively to plate 11 of vacuum tube 2 through resistor 15 and capacitor 16 in series, and to grid 8 of vacuum tube 2.

Figure 7:
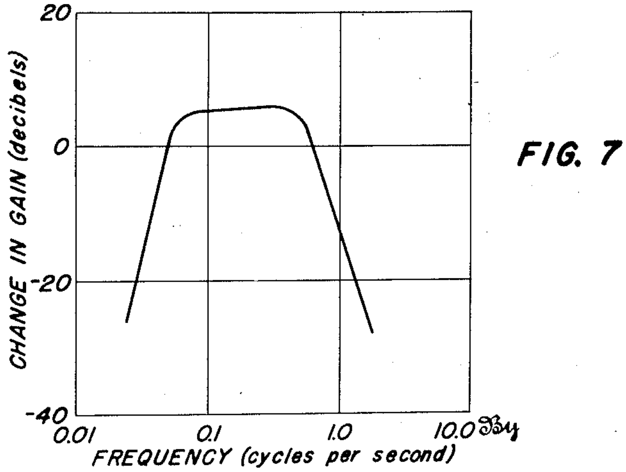

The operation of the individual high-pass and low-pass filter portions of the system of Fig. 4 is substantially identical with that described respectively in connection with Figs. 2 and 3. The over-all characteristic curve which was obtained with one particular embodiment arranged in accordance with Fig. 4 is shown in Fig. 7. In this particular case, the system was designed to have a pass band extending from 0.07 to 0.50 cycle per second. Within this band, the response was uniform within approximately one decibel. Outside of the pass band, the transmission decreased at least 20 decibels per octave. It will be apparent to those skilled in the art that the lower and upper frequencies of the pass band, as well as the shape of the response curve both within the band and either below it or above it, may be varied within wide limits by a suitable choice of circuit constants. The constants which are given in a later paragraph are merely by way of example, and are not to be taken as in any way limiting the scope of the invention.

In order to provide quantitative data showing the improvement in performance which may be realized by filter circuits in accordance with the present invention, certain specific embodiments in accordance respectively with Figs. 2, 3 and 4 were set up and measured. The actual characteristic curves obtained with these particular embodiments are shown respectively in Figs. 5, 6 and 7. In these circuit arrangements, vacuum tubes 2 and 32 each comprised one-half of a type 6SL7 tube. The voltage of the source indicated by B+ was 300 volts. The following values of resistors and capacitors were employed:

| | | |
|---|---|---|
| Resistors 7, 23, 29, 37, 43, 48, 49 | megohm | 0.5 |
| Resistor 10 | ohms | 1500 |
| Resistors 12, 41, 47 | megohms | 0.25 |
| Resistor 15 | do | 3.5 |
| Resistors 18, 24, 25, 52 | do | 1.0 |
| Resistors 30, 35 | do | 5.0 |
| Resistor 39 | ohms | 1000 |
| Resistors 51, 56 | megohms | 0.1 |
| Capacitors 16, 42 | microfarads | 25.0 |
| Capacitors 17, 21, 22 | do | 2.0 |
| Capacitors 26, 27, 53 | do | 4.0 |
| Capacitor 28 | do | 0.35 |
| Capacitor 44 | do | 0.7 |
| Capacitors 45, 46, 54 | do | 0.5 |
| Capacitors 50, 57 | do | 1.0 |

Types of vacuum tubes other than those stated above may be employed in any of the circuit arrangements of Figs. 2, 3 and 4 without appreciably affecting the results obtained. The two vacuum tubes shown in Fig. 4 may comprise separate tubes, or two sets of elements in a single envelope, with substantially identical results.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electric wave filter comprising a degenerative feedback amplifier employing in its feedback loop a network having an attenuation curve sharply peaked for minimum transmission, and a filter network serially connected to said amplifier and having a gradually sloping transmission curve, the frequency at which the feedback network is peaked being close to the cut off frequency of the second mentioned network.

2. An electric wave filter comprising a degenerative feedback amplifier employing in its feedback loop a parallel-T network having a sharply peaked attenuation curve, and a resistive-capacitive filter network serially connected to said amplifier and having a gradually sloping transmission curve, the frequency at which said parallel-T network is peaked being close to the cut off frequency of said resistive-capacitive network.

3. An electric wave filter comprising a degenerative feedback amplifier employing in its feedback loop a parallel-T network having a sharply peaked attenuation curve, and a resistive-capacitive low-pass filter network serially connected to said amplifier and having a gradually sloping transmission curve, the frequency at which said parallel-T network is peaked being close to the cut off frequency of said resistive-capacitive network.

4. An electric wave filter comprising a degenerative feedback amplifier employing in its feedback loop a parallel-T network having a sharply peaked transmission curve, and a resistive-capacitive high-pass filter network serially connected to said amplifier and having a gradually sloping transmission curve, the frequency at which said parallel-T network is peaked being close to the cut off frequency of said resistive-capacitive network.

5. An electric wave filter comprising a first degenerative feedback amplifier employing in its feedback loop a parallel-T network having a sharply peaked attenuation curve, and a resistive-capacitive low-pass network connected to said first amplifier, said first amplifier and said low-pass network being connected in cascade to a second degenerative feedback amplifier employing in its feedback loop a parallel-T network having a sharply peaked attenuation curve, and a resistive-capacitive high-pass network connected to said second amplifier, the combination forming a band-pass filter.

6. The method of filtering an electric wave wherein the gain of an amplifier is sharply peaked at the desired frequency, comprising passing the wave to be filtered through a low-pass network having a gradually sloping transmission curve, applying the wave to the input of an amplifier employing in its feedback loop a parallel-T network having a sharply peaked attenuation curve to produce a sharply peaked gain at the desired frequency, and passing the amplified wave through a second low-pass network having a gradually sloping transmission curve.

7. The method of filtering an electric wave wherein the gain of an amplifier is sharply peaked at the desired frequency, comprising passing the wave to be filtered through a high-pass network having a gradually sloping transmission characteristic, applying the wave to the input of an amplifier employing in its feedback loop a parallel-T network having a sharply peaked attenuation curve to produce a sharply peaked gain at the desired frequency, and passing the amplified wave through a second high-pass network having a gradually sloping transmission curve.

8. The method of filtering an electric wave wherein the gain of an amplifier is sharply peaked at the desired frequency, comprising passing the wave to be filtered through a low-pass network having a gradually sloping transmission curve, applying the wave to the input of a first amplifier employing in its feedback loop a parallel-T network having a sharply peaked attenuation curve to produce a sharply peaked gain at the desired frequency, passing the amplified wave through a second low-pass network having a gradually sloping transmission curve, passing the wave through a high-pass network having a gradually sloping transmission curve, applying the wave to the input of a second amplifier employing in its feedback loop a parallel-T network having a sharply peaked attenuation curve to produce a sharply peaked gain at the desired frequency, and passing the amplified wave through a second high-pass network having a gradually sloping transmission curve.

9. A band-pass amplifier comprising serially connected high-pass and low-pass filter networks for causing gradual frequency attenuation at the limits of the pass band, and a pair of amplifiers having degenerative networks sharply peaked for minimum feedback serially connected to said high-pass and low-pass filter networks, one near the upper and one near the lower cut-off frequency of the pass band.

10. A filter system having a generally flat frequency-response characteristic over a range and a sharp cut-off frequency comprising the combination of an amplifier, a degenerative R–C feedback network for said amplifier sharply peaked for minimum feedback close to said cut-off frequency, and a filter circuit serially connected to said amplifier for passing said range of frequencies and causing gradual attenuation near the cut-off frequency of said system.

DONALD G. C. HARE.

REFERENCES CITED

The following references are of record in the file of this patent:

UNITED STATES PATENTS

| Number | Name | Date |
|---|---|---|
| 2,123,178 | Bode | July 12, 1938 |
| 2,173,426 | Scott | Sept. 19, 1939 |
| 2,245,365 | Riddle | June 10, 1941 |
| 2,372,419 | Ford | Mar. 27, 1945 |